(12) United States Patent
Vicente

(10) Patent No.: US 6,393,405 B1
(45) Date of Patent: May 21, 2002

(54) BENEFICIAL SETTLEMENT METHOD AND STORAGE MEDIA

(76) Inventor: Ramon A. Vicente, 6017 Beckenham Way, Oak Ridge, NC (US) 27310

(*) Notice: Subject to any disclaimer, the term of this patent is extended or adjusted under 35 U.S.C. 154(b) by 0 days.

(21) Appl. No.: 09/173,945

(22) Filed: Oct. 16, 1998

(51) Int. Cl.$^7$ .............................................. G06K 17/60
(52) U.S. Cl. .......................................... 705/4; 705/45
(58) Field of Search ...................................... 705/4, 45

(56) References Cited

U.S. PATENT DOCUMENTS

| | | | | |
|---|---|---|---|---|
| 5,590,037 A | * | 12/1996 | Ryan et al. ...................... | 705/4 |
| 5,907,828 A | * | 5/1999 | Meyer et al. .................... | 705/4 |
| 5,930,760 A | * | 7/1999 | Anderton et al. ............... | 705/4 |
| 5,930,778 A | * | 7/1999 | Geer ............................. | 705/45 |
| 6,012,925 A | * | 1/2000 | Kelly et al. ..................... | 434/107 |

OTHER PUBLICATIONS

Journal of Fin'l Service Professionals v52n6 pp:82–89 Nov. 98—"Viatical Settlements and High NW Transactions".*
Michael Zadoff–Nursing Homes v48n2 pp 60–62–Feb.'99—"Viatical Settlements–Nursing Home Pay".*

* cited by examiner

Primary Examiner—Vincent Millin
Assistant Examiner— Vincent Akers

(57) ABSTRACT

This invention pertains to a method of calculating payout ratios in a financial transaction in which a chronically ill individual sells a portion of his life insurance proceeds in exchange for an investor paying the premiums. The preferred implementations of the method involve a programmed computer or a storage medium which contains the preferred formula for calculating the payout ratios.

17 Claims, 2 Drawing Sheets

BENEFICIAL SETTLEMENT METHOD AND STORAGE MEDIA

BACKGROUND OF THE INVENTION

1. Field of the Invention

This invention pertains to a method of preparing beneficial settlements for the chronically ill using life insurance policies. The method is best implemented by a computer or similar device.

2. Description of the Prior Art and Objectives of the Invention

Viatical settlements have existed within the financial community for several years. In the typical viatical transaction, the investor purchases a life insurance policy of a terminally ill individual for an amount calculated from the individual's life expectancy. The terminally ill patient gets an immediate infusion of cash to pay medical bills or the like and the investor ultimately receives the proceeds from the life insurance policy. Thus, the investor gambles that the insured individual will die at or before the insured's present life expectancy by paying the present value of the policy's face value, based on that life expectancy.

However, continuing medical advances make this a risky proposition for the investor. As new drugs arrive on the market and new methods of treating illnesses become widespread through the research and dedication of doctors, life expectancies, especially among HIV positive individuals continue to increase. While good for the terminally ill patient, these advances make viatical transactions poor vehicles for investment.

With the above concern in mind, it is an objective of the present invention to provide a beneficial settlement package for terminally or chronically ill individuals which still provides a solid vehicle for investment.

It is a further objective of the present invention to present storage media which contains the instructions to arrive at the beneficial settlement.

It is still a further objective of the present invention to provide a method which provides a certain level of return based on the investor's desired criteria.

It is yet a further objective of the present invention to provide a computer which is programmed to provide the output indicating the levels of returns for the beneficial settlement.

It is another objective to allow chronically ill individuals to extend their life insurance coverage in exchange for a decreased payout to his beneficiaries.

These and other objectives and advantages will become readily apparent to those skilled in the art upon reference to the following detailed description and accompanying drawing figures.

SUMMARY OF THE INVENTION

The aforedescribed objectives and advantages are realized by providing a method of calculating a financial transaction which is well suited for computer or other storage media implementation. While a conventional spread sheet program, such as QuattroPro™, may supply the most dramatic presentation, the algorithms used to arrive at the desired outputs are unique to the present invention.

The method essentially consists of the chronically ill patient or insured contracting to allow the investor to pay the premiums of the life insurance policy in exchange for a portion of the life insurance proceeds. It should be understood that the word "investor" may represent an individual or a corporation as suits the needs of the insured or capital providing parties.

Initially a conventional screening process is completed to verify that the insured individual is in fact appropriately chronically ill and presently carries a life insurance policy. This screening process is nearly identical to the screening process used in conventional viatical settlements, except that it accepts chronically ill individuals, not just terminally ill individuals. Thus, there is less concern about the predicted moment of death, rather the concern is whether the individual is chronically ill, which is presently defined as remaining ill for more than ten years. After passing through the initial screening process, the insured provides to the investor the numbers representing a total death benefit of the life insurance policy and the total annual premiums required to keep the life insurance policy in place. A ratio is calculated by dividing the premiums by the death benefit. This ratio (always less than one) is called variable A.

A second variable is selected and labeled B. B is preferably between zero (0) and twenty (20) and ideally approximately four (4). While negative numbers and numbers larger than twenty are possible, such numbers impact the ultimate payouts in a generally undesirable fashion and are not preferred.

A third variable is selected and labeled C. C is preferably between zero (0) and ten (10) and ideally twenty-five hundredths (0.25). Again, while negative numbers and numbers larger than ten are possible, such numbers impact the ultimate payouts in a generally undesirable fashion and are not preferred.

The three variables are plugged into the following equation:

$$\text{Output} = \{1 - [(B + (C*(n-1))) + (A*100*(B + (C*(n-1))))]/100\} * (\text{Total death benefit})$$

Where n represents the year of the contract. This equation provides the first year death benefit. That is, if the insured dies in the first year of the contract, the insured's estate receives the output, and the investor receives the value of the life insurance policy (Total death benefit) minus the output.

This equation is iteratively used incrementing n by one every year and substituting the previous output for the total death benefit to provide outputs for each year of the contract. The contract is completed when the amount of the premiums paid by the investor plus his required rate of return equals the total death benefit, at which time the investor preferably owns the entire proceeds of the life insurance policy. This requires the investor to continue paying the life insurance premiums, but he ultimately receives the entire proceeds when the insured passes away. This shifts the risk from the investor as in typical viatical transactions to the insured. Whereas in typical viatical transactions if the insured exceeds his life expectancy, the investor loses money, in the present method, if the insured exceeds his life expectancy, his estate gets nothing. On the other hand, the insured is provided the opportunity to extend his life insurance coverage much further than he might otherwise be able to afford, and can have the peace of mind that he will leave money to his estate in all likelihood.

DETAILED DESCRIPTION OF THE PREFERRED EMBODIMENTS AND OPERATION OF THE INVENTION

Figure 3:
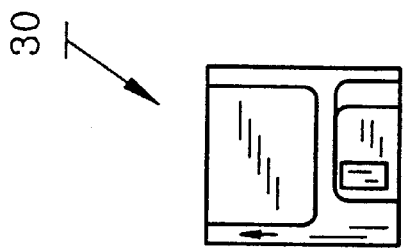
FIG. 3 demonstrates a conventional storage medium.
Figure 2:
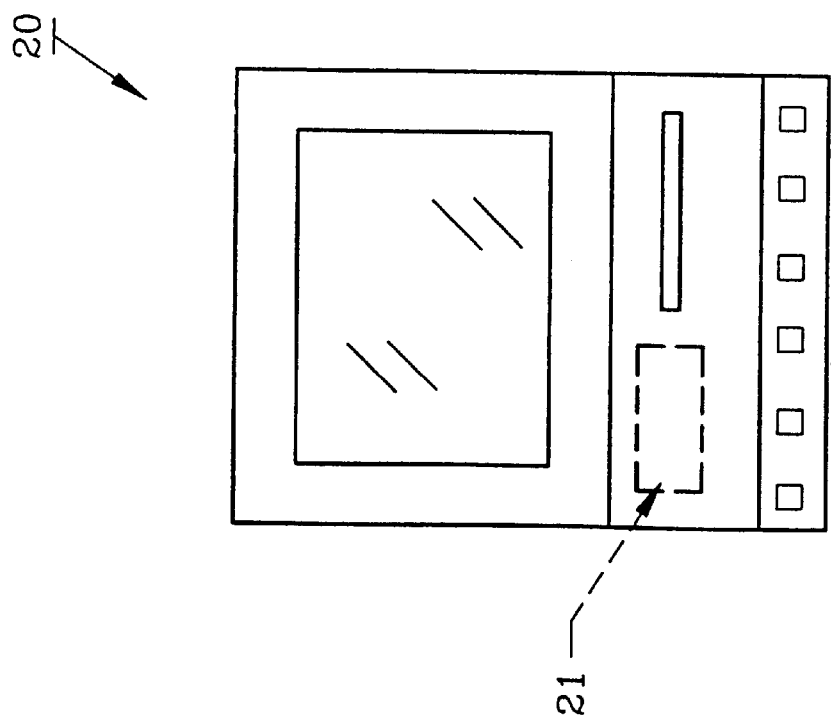
FIG. 2 illustrates a conventional computer.

The present invention is ideally suited for placement on conventional storage media such as floppy disks, compact discs, hard drives, tapes or the like. While it is possible to perform the calculations on paper with a pen or pencil, such is not preferred, although paper is considered a storage medium for the purposes of the present invention. Likewise, the preferred implementation of the present invention is on a computer programmed with the below described method. Such a computer would include a central processor and storage means as is conventional. It is possible to provide the output of the method with a conventional calculator using the present method, and such should be considered within the scope of the present invention. Conventional computer 20 with hard drive 21 is seen in FIG. 2 with conventional floppy disk storage medium 30 in FIG. 3.

Figure 1:
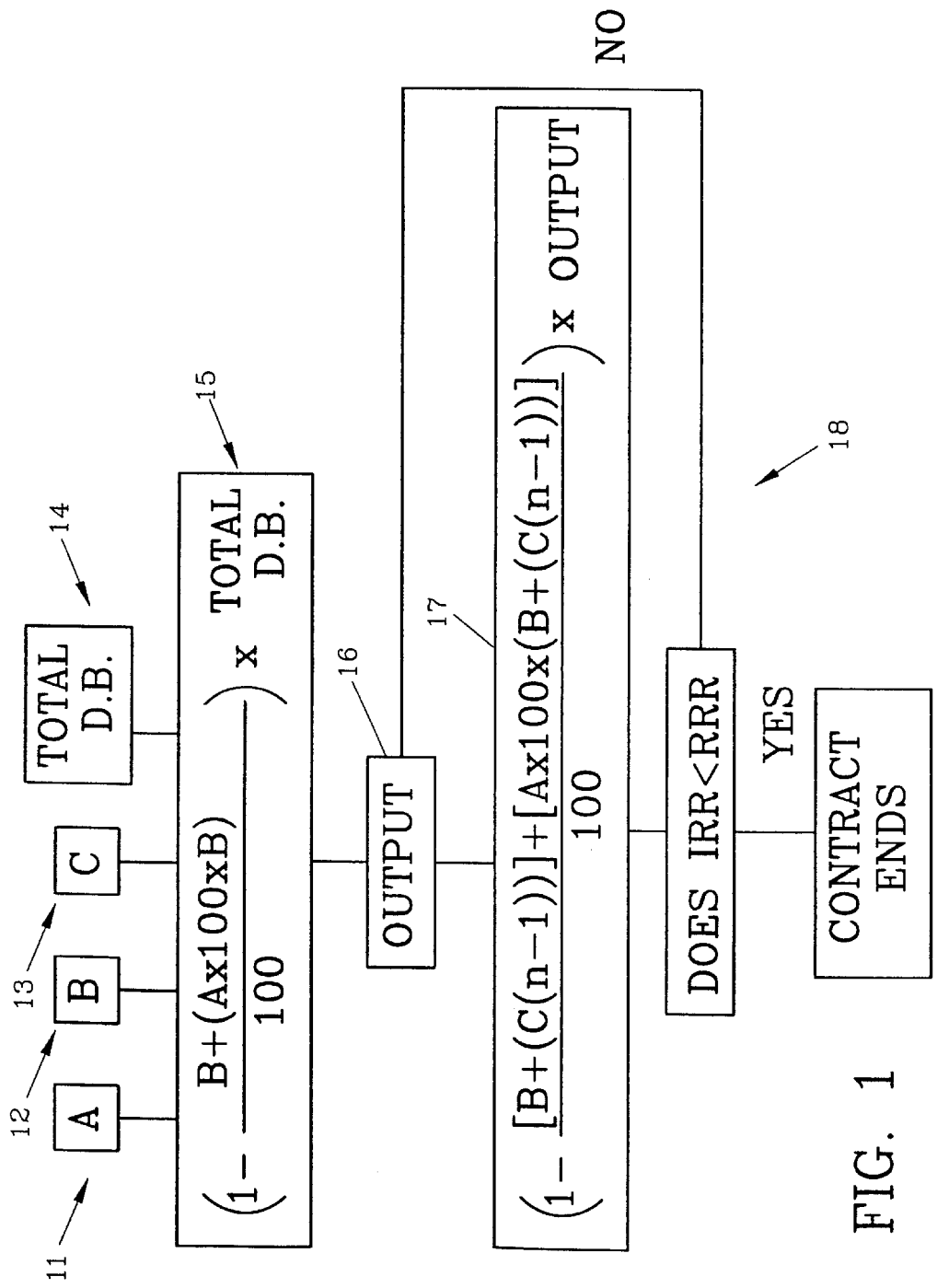
FIG. 1 shows a flow diagram of the method of the invention.

After an initial conventional qualification step, which determines whether an individual has a valid life insurance policy and is chronically ill with a life expectancy of twelve (12) years or less and the lowest probability of survival at fifteen (15) years, the next step of the method is to calculate the relative payouts for the term of the contract. This comprises as seen in FIG. 1, inputting three variables A, B, and C, labeled 11–13 respectively. Variable A 11 is calculated by dividing the cost of the annual premiums of the life insurance policy by the total death benefits provided by the life insurance. Variable B 12 is selected by the investor according to his requirements, but is preferably a number between zero and twenty, with four (4) being the most preferred value. B 12 may be zero, negative or greater than twenty, but such is not preferred. B 12 may also be referred to as the premium multiple. Variable C 13 is also selected by the investor according to his requirements, but is preferably a number between zero and ten, with twenty-five hundredths (0.25) being the most preferred value. C 13 may be zero, negative or greater than ten, but such is not preferred. C 13 may also be referred to as the premium multiple adjustment variable. The total death benefit 14 is input as another variable.

In the preferred implementation, a software program prompts the user for these values 11–14 and then manipulates them via formula 15. Formula 15 is as follows:

$$\text{Output} = \{1[B+(A*100*B)]/100\}*(\text{Total death benefit})$$

Initial output 16 is stored in memory of the computer (not shown) and then used in formula 17 to further calculate subsequent yearly payout ratios, where n is the year of the contract. Formula 17 is as follows:

$$\text{Output} = \{1-[(B+(C*(n-1)))+(A*100*(B+(C*(n-1))))]/100\}*(\text{Previous output})$$

When the investor's minimum required rate of return is not met, (FIG. 1, generally at 18) usually at 12–20 years, the investor continues to pay for the life insurance policy, and when the insured passes away, the investor recovers the entire proceeds of the life insurance policy. It should be noted that there may be situations where the cost of the premiums is so prohibitive that the contract only extends for eight or nine years. This is a financial decision, and does not impact the methodology disclosed herein.

The software program or computer then outputs to a visual display (not shown) each output so that the user may see what the payout ratios are for each year of the contract and when the contract ends.

An example of the method is presented below where the insured has a $180,000 total death benefit and annual premiums of $3600. This results in a ratio of 0.02. B is chosen to be four as is preferred and C is chosen to be 0.25 as is preferred. Plugging into the formula results in the following table of payout ratios.

| Year | Estate Receives | Investor Receives |
|---|---|---|
| 1 | 158,400 | 21,600 |
| 2 | 138,204 | 41,796 |
| 3 | 119,546 | 60,454 |
| 4 | 102,511 | 77,489 |
| 5 | 87,134 | 92,866 |
| 6 | 73,411 | 106,589 |
| 7 | 61,298 | 118702 |
| 8 | 50,724 | 129,276 |
| 9 | 41,594 | 138,406 |
| 10 | 33,795 | 146,205 |
| 11 | 27,205 | 152,795 |
| 12 | 21,696 | 158,304 |
| 13 | 0 | 180,000 |
| 14 | 0 | 180,000 |
| 15 | 0 | 180,000 |

Thus, for example if the client dies at year 5, the formula calculates follows:

Year 1: $\{1-[4+(0.02*100*4)]/100\}*180,000=\$158,400$ for the estate

Year 2: $\{1-[(4+(0.25*(2-1)))+(0.02*100*(4+(0.25*(2-1))))]/100*158,400=\$138,204$ Year 3: $\{1-[(4+(0.25*(3-1)))+(0.02*100*(4+(0.25*(3-1))))]/100*138,204=\$119,546$ Year 4: $\{1-[(4+(0.25*(4-1)))+(0.02*100*(4+(0.25*(4-1))))]/100*119,546=\$102,204$ Year 5: $\{1-[(4+(0.25*(5-1)))+(0.02*100*(4+(0.25*(5-1))))]/100*102,204=\$87,134$ So the estate would receive $87,134, and the investor would receive $92,866. This formula is unrelated to the life expectancy of the insured, but if the insured lives past the cost of the premiums plus the investor's required rate of return, then his estate gets nothing. However, in most instances, the insured will pass away before that event happens and his estate will receive some portion of the life insurance proceeds. It should be noted that at year 13, in order to meet the required rate of return, the investor needs to recover the full proceeds of the life insurance policy, and the amount the estate receives is then zero dollars. This effectively allows the insured to keep a life insurance policy without paying for it until his death, thus freeing money for medical bills or the like.

If B or C increases the amount of money that the estate receives decreases more rapidly. If B or C is negative the estate receives more money over time. This is undesirable since it actually represents a loss of investment by the investor. However, in certain transactions, such results may be desirable to the investor to take advantage of estate and gift tax laws or the like. But for the average investor, these represent undesirable outcomes.

The preceding recitation is provided as an example of the preferred embodiments and is not meant to limit the nature of scope of the present invention or appended claims.

I claim:

1. A computer implemented method of calculating a beneficial settlement for a chronically ill insured, said method comprising the steps of:

a) screening a chronically ill insured;
b) inputting a plurality of variables of the chronically ill insured's life insurance policy into the computer;
c) manipulating the variables in a predetermined fashion to produce a first year's death benefit payment to the insured's beneficiary; and
d) iteratively manipulating the variables to produce subsequent year's death benefit payment values to the insured's beneficiary.

2. The method of claim 1 wherein inputting a plurality of variables comprises the step of inputting a premium to death benefit ratio A.

3. The method of claim 1 wherein inputting a plurality of variables comprises the step of inputting a premium multiple B.

4. The method of claim 1 wherein inputting a plurality of variables comprises the step of inputting a premium multiple adjustment variable C.

5. The method of claim 4 wherein inputting a plurality of variables further comprises the steps of inputting a premium multiple, a death benefit ratio and a total death benefit.

6. The method of claim 1 wherein inputting a plurality of variables comprises the step of inputting a total death benefit.

7. The method of claim 5 wherein manipulating the variables in a predetermined fashion to produce a first year's payment to the chronically ill insured's beneficiary comprises the step of putting the variables into a computer program within the computer having the following enabling equation:

$$\text{Output} = \{1 - [B + (A*100*B)]/100\} * (\text{Total death benefit})$$

wherein said output represents the first year's payment to the insured's beneficiary.

8. The method of claim 3 wherein B is a number between zero and twenty.

9. The method of claim 8 wherein B is four.

10. The method of claim 4 wherein C is a number between zero and ten.

11. The method of claim 10 wherein C is 0.25.

12. A computer program storage medium having code that when executed allows a computer to:
a) accept a plurality of variables of a chronically ill insured's life insurance policy and selected premium multiples;
b) manipulate said plurality of variables to create a plurality of outputs representing mutually exclusive death benefit payments to the beneficiary of a chronically ill insured; and
c) provide a display for said plurality of outputs.

13. The storage medium of claim 12 wherein said formula is $$\text{Output} = \{1 - [(B + C*(n-1)) + (A*100*(B + C*(n-1)))]/100\} * (\text{total death benefit or previous output}).$$

14. The computer program storage medium of claim 12 wherein said storage medium is a computer disk.

15. The computer program storage medium of claim 12 wherein said storage medium is a computer hard drive.

16. A computer for calculating relative payouts between an investor and a beneficiary of a chronically ill insured covered by a life insurance policy, wherein said insured contracts with the investor to have the investor pay the premiums on the life insurance policy in exchange for a portion of the life insurance policy proceeds, said computer comprising:
a) a processor for processing data;
b) a computer program comprising enablement for processing data of a chronically ill insured regarding relative death benefit payouts on a yearly schedule loaded within said computer for displaying said relative payouts in a graphical form.

17. The computer of claim 16 wherein said computer program when executed implements the following formula:

$$\text{Output} = \{1 - [(B + (C*(n-1))) + (A*100*(B + (C*(n-1))))]/100\} * (\text{Total death benefit}).$$

* * * * *